United States Patent Office 2,720,765
Patented Oct. 18, 1955

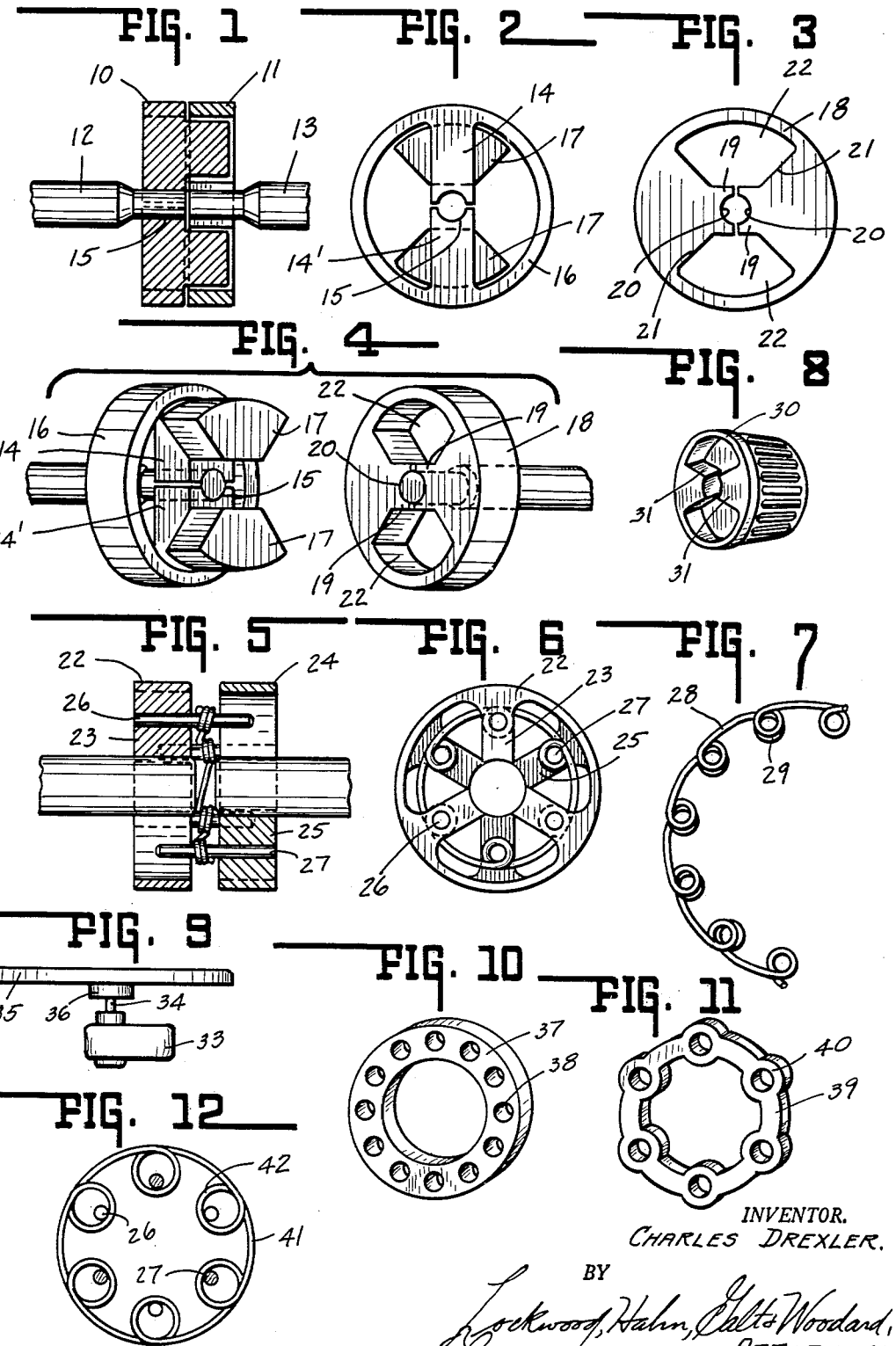

2,720,765

SHAFT DRIVING OR DRIVEN MEANS

Charles Drexler, Indianapolis, Ind.

Application October 19, 1950, Serial No. 191,024

5 Claims. (Cl. 64—30)

The present invention relates to shaft driving or driven means and primarily to a friction means for effecting a drive to or from a shaft of the small power type.

The invention also relates to a coupling for frictionally connecting two shafts, one being the driving and the other the driven shaft.

More specifically, the invention relates to an overload friction driving or driven means which under predetermined load will permit a relative slip between the parts.

Another object of the invention is to provide a driving means for driving small members such as a phonograph turn table from an electric motor, the driving being of such a type that under predetermined conditions a slip may occur between the drive shaft and the motor.

Another object of my invention is to provide a friction clutching means between the operating knob of a radio tuning dial indicator or like device, the arrangement being such when the indicator reaches the limit of its possible continued movement or operation of the knob will not effect the movement of the indicator.

A further feature and object of the invention is to provide a convenient "slip on" friction grip connection between an element such as a knob or wheel, and a shaft; thus by means of this invention such element may be slip mounted onto a shaft or pin and retain its position thereon without the need of said screws, knurls or the like due to the friction grip as hereinafter more particularly set forth and described. Irrespective of the torque limiting slipping action, as above mentioned, and wherein the shaft or pin may be provided with a flat or keyway so as to effect a positive driving connection, the resilient friction clutching action of the radial arms of the element having matching contour therewith, will be sufficient to retain the element and shaft in related position.

For the purpose of illustrating the invention I have illustrated certain embodiments thereof in the accompanying drawings.

Fig. 1 is a longitudinal sectional view of a coupling embodying the invention.

Fig. 2 is an elevation of the coupling member.

Fig. 3 is an elevation of what may be termed the female coupling member.

Fig. 4 is a perspective view showing the coupling members of Figs. 1 to 3 separated.

Fig. 5 is a sectional view showing a modification of a coupling member.

Fig. 6 is an end elevation of the structure shown in Fig. 5.

Fig. 7 is a perspective view of the connecting means between the two coupling members forming the unit illustrated in Figs. 5 and 6.

Fig. 8 is a perspective view of a modification of my invention wherein a knob is provided for operating the indicator of a radio dial.

Fig. 9 is an elevation showing more or less diagrammatically a drive between a synchronous motor and the turn table of a phonograph.

Fig. 10 is an elevation of a modification of the connecting means between the two coupling members forming the unit illustrated in Figs. 5 and 6.

Fig. 11 is a further modification of such coupling member.

Fig. 12 is a still further modification of the same.

In the embodiment of the invention illustrated in Figs. 1 to 4, inclusive, there is provided what may be termed for designation a male member 10 and a female member 11, the male member 10 being adapted to be connected to a driving shaft 12 and the female member being adapted to be connected to the driven shaft 13.

It is to be understood that the designation "driving" and "driven" shaft is used primarily for the purpose of illustration and either shaft may be the driving or driven shaft.

The member 10 comprises two or more pairs of radial arms 14 and 14', oppositely disposed and each having its inner free end formed with a friction face, which may be arcuate as at 15 for the purpose of embracing a shaft, such as the shaft 12. These arms extend radially inwardly from and form a part of an outer rim 16 which has a degree of resiliency to the extent that when the friction faces embrace the shaft the rim 16 is distorted and as a result biases the arms toward one another with the friction faces engaging the surface of the shaft.

The material from which this member may be formed may be of any desired character as, for instance, steel, iron, plastics, or non-ferrous metals or die casting of various material, and in fact any material which will enable the rim to be resilient to the desired extent and the arms to be substantially rigid, or, as in the case of plastics or die casting, a coil spring or steel band may be moulded or placed in or on said rim to insure more constant pressure to the arms. The arms 14 are provided with quadrant extensions 17 which extend in a direction parallel to the axis of the shaft embracing face.

The female member 11 is similarly constructed, in that it is constructed of the same material or, if desired, may be constructed of different material and includes a rim 18 which is provided with the inwardly directed radial arms 19 having clutching faces 20. These arms diverge towards the rim as at 21 and accordingly provide quadrant shaped spaces 22 between the arms adapted to receive the projecting members 17 of the member 10.

Preferably the openings 22 are slightly larger than the spacing between the sides of the openings or the spacing between the walls of the projection 17 so that a limited amount of play may occur between the coupling members when the coupling members are engaged. Such an arrangement provides to a limited extent a universal coupling between the shafts whereby one of the shafts may be disposed at an angle relative to the axis of the other shaft and the coupling still be effective.

In the structure illustrated in Figs. 5 and 6 I have provided a universal coupling for connecting a pair of shafts having the overload characteristic of the coupling illustrated in Figs. 1 to 4. In this structure the male coupling 22 is provided with a plurality of inwardly extending arms 23, in this instance three, structurally similar to the arms 14 of the structures illustrated in Figs. 1 to 4 without the connection projections 17. A female member 24 is likewise provided with corresponding inwardly extending arms 25. The arms 23 are each provided with a pin 26 extending parallel to the axis of the engaging faces of the arms and the arms 25 are provided with similar pins 27.

Mention might be made of the fact that the arms of one coupling member are offset relatively to the arms of the other so that spaces left between the arms have the accommodation of the pins of the arms of the other member. The pins of the two members are rotatively connected by a connecting band 28 which may be formed of wire and is provided with a series of spaced apart coils 29 forming eyes so spaced as to receive alternatively the pins 26 of the member 22 and the pins 27 of the member 24.

The arrangement is such that angular displacement of the shafts or coupling members relatively to one another is freely permitted while one coupling member is drivingly connected with the other coupling member. Not only does this structure permit of angular displacement of the coupling members but it also permits to a limited extent a transverse displacement of the coupling members so that the two shafts adapted to be connected by the coupling members need not be in exact alignment or one shaft may be displaced at an angle relative to the axis of the other.

The degree of friction engagement by the engaging arms of each of the coupling members may be controlled by controlling the thickness of the rims, such as the rims 16 and 18. By increasing the thickness of the rims the degree of resiliency is reduced and as a result the biasing effect is much greater.

In Fig. 8 I have shown my invention embodied in the turning knob for shafts for controlling such structures as radio dials, etc. In structures of this character the rim member 30 is continued rearwardly into the shape of a knob structure and is provided with the inwardly directed radial arms such as 31 which have their inner ends spaced apart slightly and contoured to fit around the shaft of the dial indicator. By such a structure, while the frictional engagement between the arms 31 and the shaft is sufficient to permit normal operation of the radio indicating dial, in event the limit of movement in either direction is reached the knob may be turned without placing undue strain on the shaft.

In Fig. 9 I have illustrated more or less diagrammatically a structure for driving the turn table of a phonograph from a small synchronous motor. In this structure the synchronous motor 33 which is generally mounted in a vertical position is provided with a shaft 34.

The turn table 35 may be fixedly secured to the under face thereof of a friction drive device 36 of the type illustrated in Fig. 2, for example.

In Fig. 10 I have illustrated a modified coupling member between the two coupling members of the type illustrated in Figs. 5 and 6. This coupling member may take the place of the structure shown, for example, in Fig. 7. In this structure I provide a rubber disc 37 which is provided with perforations 38 adapted to receive the pins 26 and 27 of the coupling member shown in Fig. 5. This structure provides a more or less universal coupling between the two coupling members so that the shafts adapted to be connected thereby can be disposed at a slight angle relatively to one another, and due to the fact that the coupling member is made of rubber and is flexible the shafts may be offset axially from one another.

In Fig. 11 I have illustrated a further type of coupling member to take the place of that shown in Fig. 7. In this instance, the coupling member is formed of flexible material such as rubber which takes the form of a ring 39 having enlarged portions provided with eyes 40 adapted to receive the fingers 26 and 27. In effect, this structure is substantially the same as that shown in Fig. 10.

In Fig. 12 I have shown a still further modification of the structure illustrated in Fig. 7 wherein the wire ring 41 assumes somewhat the same characteristic as the wire ring 28 in Fig. 7. In this structure, however, the pin receiving loops 42 are considerably larger in diameter than the pins so that there will be a relative rotative movement between the two coupling members such as is illustrated in Fig. 5. Furthermore, this structure also provides for a more or less universal coupling between the two members 22 and 24 and likewise provides for a relative great offset of the shafts.

From the foregoing it will be observed that the basic principle involved in this invention resides in the inherent spring action of the peripheral rim or band indicated in the various figures at 16, 18, 22, 24 and 30; and wherein said peripheral rim or band carries diametrically and inwardly extending rigid gripping arms which move inwardly and outwardly toward the shaft to be gripped under the flexing of the spring band. They are thus held in clutching engagement with the shaft due to the inherent tension of the peripheral band with which they are connected. Their inner clutching surfaces are designed to conform to the cylindrical form of the shaft in a circular path, normally slightly less than the diameter of the shaft to be gripped. They may be spread apart for insertion or removal of the shaft by squeezing the band transversely thereof which serves to spread the inner clutching ends of the arms, but when the band is released the arms return to their normal condition under its inherent spring tension so as to yieldingly force the arms toward each other into their clutching engagement.

Wherein reference is made to a shaft, it will be appreciated that this term encompasses any member such as a spindle, boss or the like, with which the gripping arms are adapted to engage for clutching action.

The invention claimed is:

1. A coupling comprising a pair of coupling members each comprising a rim having radially inwardly extending arms the inner ends of which provide friction faces, connecting members extending from the arms of each of said members substantially parallel with the axis of the rims thereof and in staggered relation to one another and an annular coupling member having eyes formed therein adapted to receive the projecting connecting members.

2. A coupling comprising a pair of coupling members each of which comprises a rim having a plurality of radially inwardly projecting arms, the ends of which provide friction faces, the respective arms of each member having connecting pins extending therefrom parallel with the axis of the rims and a connection member comprising a ring-like wire member coiled at spaced intervals to provide eyes for receiving the connecting pins.

3. A clutch member comprising a circumferential rim having a degree of resiliency permitting distortion thereof under inherent spring tension, a plurality of rigid angularly-spaced arms extending radially inwardly from said rim toward a common center, and a friction clutch surface on the inner end of each of said arms for clutching engagement with an annular shaft, the clutching surfaces of said arms lying in a circular path normally of slightly less diameter than the shaft to be clutched and adapted to be sprung into clutching engagement therewith under the inherent spring tension of said rim.

4. A torque limiting clutch member comprising a circumferential rim having a degree of resiliency permitting distortion thereof under inherent spring tension, a plurality of rigid angularly-spaced arms extending radially inwardly from said rim toward a common center, and a friction clutch surface on the inner end of each of said arms for clutching engagement with an annular shaft for imparting torque thereto, the clutching surfaces of said arms lying in a circular path normally of slightly less diameter than the shaft to be clutched and adapted to be sprung into clutching engagement therewith under the inherent spring tension of said rim, the spring tension of said rim causing said arms to clutch said shaft under such frictional contact as to impart torque therebetween and slip about said shaft upon an overload torque being applied thereto.

5. A clutch member comprising a circumferential rim having a degree of resiliency permitting distortion thereof under inherent spring tension, a pair of opposed rigid arms formed integral with said rim to extend radially inwardly therefrom toward a common center, and a friction clutch surface on the inner end of each of said arms for clutching engagement with an annular shaft, the clutching surfaces of said arms lying in a circular path to substantially surround said shaft and normally of slightly less diameter for clutching engagement therewith under the inherent spring tension of said rim.

References Cited in the file of this patent

UNITED STATES PATENTS

| | | |
|---|---|---|
| 309,679 | Bacon | Dec. 23, 1884 |
| 2,146,253 | Erwood | Feb. 7, 1939 |
| 2,543,396 | Wolff | Feb. 27, 1951 |